UNITED STATES PATENT OFFICE.

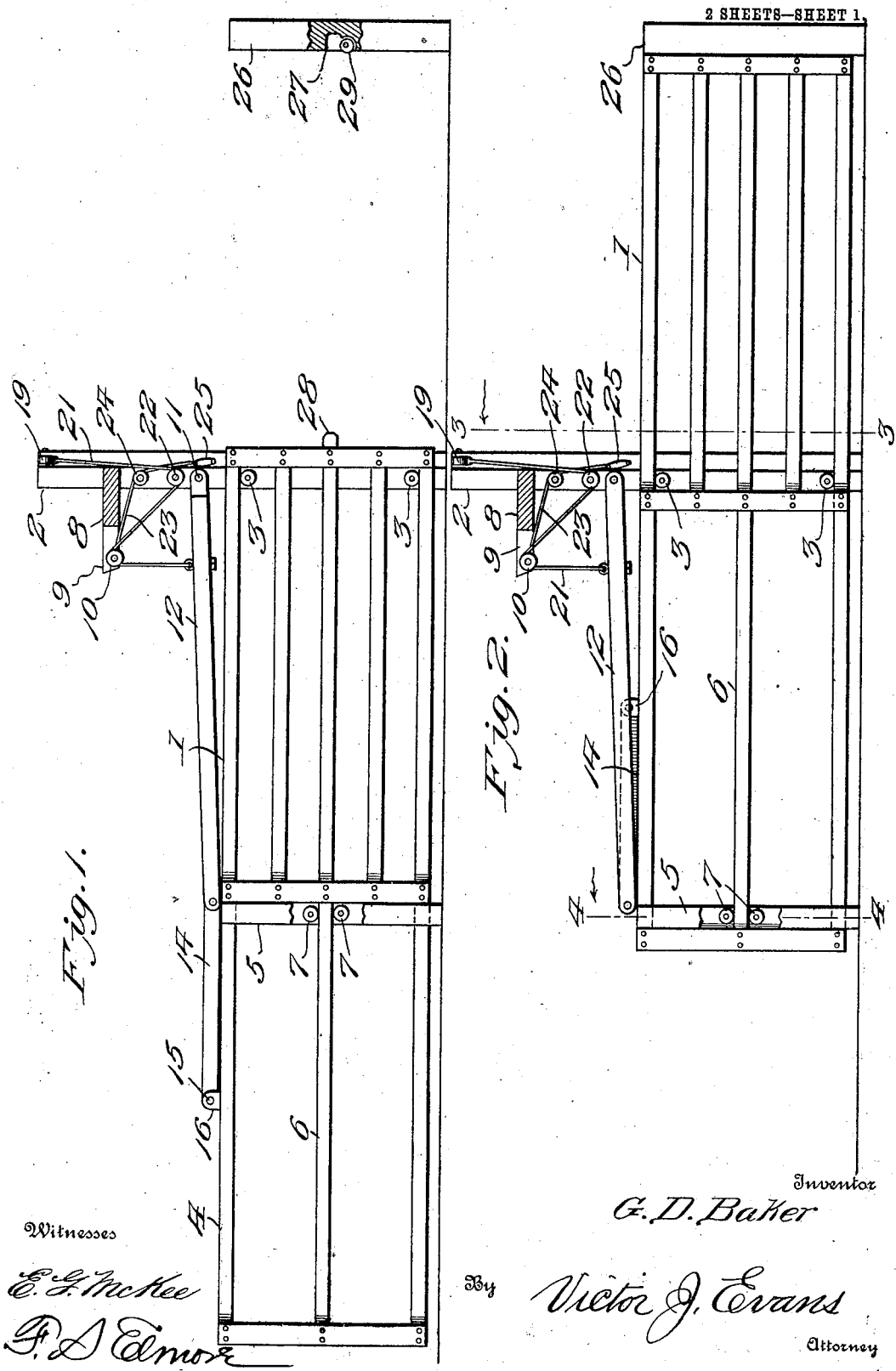

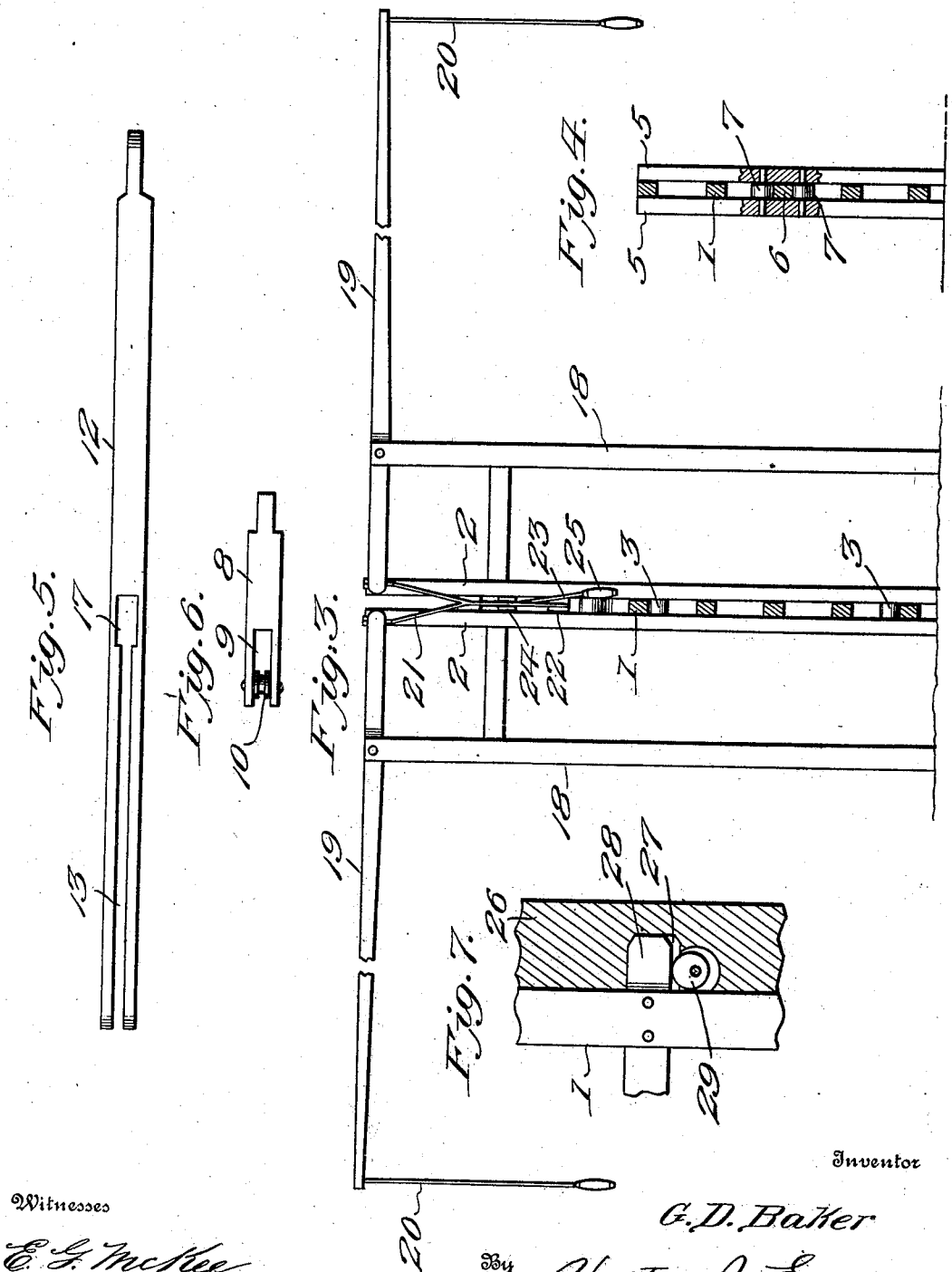

GUILFORD D. BAKER, OF WHITESBORO, TEXAS.

GATE.

No. 833,661.     Specification of Letters Patent.     Patented Oct. 16, 1906.

Application filed March 24, 1906. Serial No. 307,888.

*To all whom it may concern:*

Be it known that I, GUILFORD D. BAKER, a citizen of the United States, residing at Whitesboro, in the county of Grayson and State of Texas, have invented certain new and useful Improvements in Gates, of which the following is a specification.

This invention relates to gates of the type embodying a lever mechanism adapted for operation by a person seated in a vehicle or upon horseback to open and close the gate, and has for its objects to provide a comparatively simple inexpensive device of this character which may be readily operated, one wherein the levers which are connected directly with and for moving the gate will occupy an unobstructing position when the gate is in either open or closed position, and one wherein the movements of the gate will be free and easy.

With these and other objects in view the invention comprises the novel features of construction and combination of parts more fully hereinafter described.

In the accompanying drawings, Figure 1 is a side elevation of a gate embodying the invention and showing the same in open position. Fig. 2 is a similar view showing the gate closed. Fig. 3 is a vertical section taken on the line 3 3 of Fig. 2 and viewed in the direction of the arrow. Fig. 4 is a section taken on the line 4 4 of Fig. 2. Fig. 5 is a plan view of the main actuating-lever. Fig. 6 is a similar view of the arm carrying the rope-guide. Fig. 7 is an enlarged detail view, partly in section, showing the gate-latch.

Referring to the drawings, 1 designates a gate adapted to move back and forth across the roadway and arranged for travel between a pair of spaced central posts or standards 2, having journaled between them suitable guide members or rollers 3, engaged, respectively, by the upper and lower rails of the gate. This has a rear portion or extension 4, the central longitudinal bar 6 whereof is guided by two rollers 7, journaled between a pair of rear posts 5, while attached between the standards 2 at a point above and suitably remote from the gate is a rearwardly-projecting bracket-arm 8, having a bifurcated slotted end, in the slot 9 of which there is journaled a guide-pulley 10 for a purpose which will presently appear.

Pivoted at its forward end, as at 11, between the uprights 2 is a gate-actuating member or lever 12, provided throughout a portion of its length with a rearwardly-opening slot 13 and having its rear ends pivoted to a connecting member or link 14, in turn pivoted, as at 15, to a bearing member or ear 16, provided on the gate extension 4, the slot 13, which normally receives the link 14, being provided at its forward end with an enlargement 17 for the reception of the bearing-ear 15.

Pivoted between their ends to the upper ends of posts or standards 18 is a pair of operating-levers 19, disposed, respectively, on opposite sides of the gate and extending oppositely therefrom in a direction parallel with the road, said levers being provided at their outer ends with depending pull-cords 20 and connected at their inner ends by a flexible traction element or cable 21, in turn connected with the lever 12 and arranged for travel between its ends over the guide-pulley 10 and a second guide-pulley 22, journaled between the posts 2 at a point immediately above the fulcrum 11, while engaged with the traction element 21 is a second or branch element 23, arranged for travel over a guide-pulley 24 and provided at its free end with a handpiece 25.

Planted at the far side of the road in line with the gate 1 is a latch-post 26, provided with a socket 27, adapted to receive a projecting latch 28 on the gate, there being eccentrically journaled in a recess beneath the socket 27 a roller 29, over which the latch rides and by which it is clamped in the socket 27 when the gate is in closed position.

In practice when it is desired to open the gate downward traction is exerted upon the outer end of either of the levers through the medium of the pull-cord 20, thus causing the traction element 21 to swing the lever 12 upward, during which operation the gate will travel freely upon the guide-rollers 3 and 7 and the link 14 will assume a position in alinement with the lever 12. In closing the gate the parts are similarly operated and the gate caused to travel from the position shown in Fig. 1 to that illustrated in Fig. 2 with the link 14 in folded condition relative to the lever 12, it being noted that when the gate is in normally closed position the link is disposed within the slot 13, the enlargement portion 17 of which receives the bearing-ears 15, and that owing to the parts occupying such position the gate is braced laterally against movement. When necessary or desirable, the gate may be opened or closed through the medium of the auxiliary or branch traction element 23, it being apparent that by grasping the handle 25 and pulling on the branch cord the main traction element 21 will be caused to operate the lever 12, as heretofore explained.

Having thus described my invention, what I claim is—

1. A gate mounted for longitudinal sliding movement, gate-sustaining means comprising a pair of spaced vertical standards, an actuating-lever pivoted to the standards and operatively connected with the gate, a bracket-arm attached to and projecting rearwardly from the standards at a point remote from the actuating-lever, a guide-roller journaled on the arm, a second guide-roller journaled between the standards in a plane below that of the first-named roller operating-levers pivotally sustained adjacent the standards, and a flexible traction element connected with the operating-levers and with the actuating-lever, said gate being arranged for travel between its ends on the guide-rollers.

2. A gate arranged for longitudinal movement to open or closed position, means for sustaining the gate, a vertical standard, an actuating-lever pivoted to the standard, a link pivoted to the lever and pivotally connected with the gate, said lever being provided with a longitudinal slot adapted to normally receive the link, a bracket-arm attached to and projecting rearwardly from the standard at a point above and remote from the lever, a guide-roller journaled on the arm, a second guide-roller journaled on the standard in a plane beneath that of the first-named roller, a flexible traction element connected with the lever and arranged for travel on the guide-rollers and a pivoted operating-lever connected with the traction element and extending transversely outward from the gate.

In testimony whereof I affix my signature in presence of two witnesses.

GUILFORD D. BAKER.

Witnesses:
BRUCE W. BRYANT,
JNO. S. CRAVENS.